United States Patent
Gallimore et al.

(10) Patent No.: US 9,447,817 B2
(45) Date of Patent: Sep. 20, 2016

(54) BEARING STRUCTURE

(71) Applicant: ROLLS-ROYCE plc, London (GB)

(72) Inventors: Stephen Gallimore, Lincoln (GB); Paul Fletcher, Rugby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 14/961,027

(22) Filed: Dec. 7, 2015

(65) Prior Publication Data

US 2016/0160910 A1     Jun. 9, 2016

(30) Foreign Application Priority Data

Dec. 9, 2014  (GB) .................................. 1421880.4

(51) Int. Cl.
| | |
|---|---|
| F16C 27/00 | (2006.01) |
| F16C 19/54 | (2006.01) |
| F16C 19/52 | (2006.01) |
| F16C 19/06 | (2006.01) |
| F16C 35/04 | (2006.01) |
| F16C 33/78 | (2006.01) |
| F01D 25/16 | (2006.01) |

(52) U.S. Cl.
CPC ............... *F16C 19/54* (2013.01); *F01D 25/16* (2013.01); *F16C 19/06* (2013.01); *F16C 19/522* (2013.01); *F16C 33/7816* (2013.01); *F16C 35/042* (2013.01); *F05D 2220/32* (2013.01); *F05D 2240/54* (2013.01)

(58) Field of Classification Search
CPC ........ F16C 23/06; F16C 27/04; F16C 19/54; F16C 19/06; F16C 19/522; F16C 33/042; F01D 25/16; F01D 25/164
See application file for complete search history.

(56) References Cited

U.S. PATENT DOCUMENTS

| | | | |
|---|---|---|---|
| 4,023,868 A | | 5/1977 | Miki |
| 4,611,934 A | * | 9/1986 | Piotrowski ............. B23Q 1/265 384/517 |

(Continued)

FOREIGN PATENT DOCUMENTS

| | | |
|---|---|---|
| DE | 101 26 103 A1 | 3/2002 |
| EP | 1 956 253 A1 | 8/2008 |

(Continued)

OTHER PUBLICATIONS

Jun. 5, 2015 Search Report issued in British Patent Application No. 1421881.2.

(Continued)

*Primary Examiner* — Thomas R. Hannon
(74) *Attorney, Agent, or Firm* — Oliff PLC

(57) ABSTRACT

Bearing structure including a first bearing, surrounded by a housing, having a first inner and outer race and first set of rolling elements between the inner and outer races and a second bearing having a second inner and outer race and second set of rolling elements between the second inner and outer races. A first compliant element is connected to the first outer race. A rigid diaphragm is connected to the first outer race between the compliant element and outer race, and is connected to the housing at its outer end. The first compliant element, outer race and rigid diaphragm at least partly define a pressure chamber. The first outer race is axially slidable relative to the second such that a pressure increase in the chamber changes the axial spacing between the first and second outer races, inducing additional axial load on the bearings which helps balance thrust load sharing.

20 Claims, 7 Drawing Sheets

(56) References Cited

U.S. PATENT DOCUMENTS

| | | | | |
|---|---|---|---|---|
| 5,603,602 | A * | 2/1997 | Romani | F01D 25/16 384/517 |
| 6,846,158 | B2 * | 1/2005 | Hull | F01D 25/164 384/99 |
| 8,727,629 | B2 * | 5/2014 | Do | F01D 25/164 384/494 |
| 2009/0103849 | A1 | 4/2009 | Maguire | |

FOREIGN PATENT DOCUMENTS

| | | |
|---|---|---|
| EP | 2 050 932 A2 | 4/2009 |
| EP | 2 246 528 A2 | 11/2010 |
| EP | 2 921 729 A2 | 9/2015 |
| EP | 2921655 A2 | 9/2015 |
| GB | 931904 A | 7/1963 |
| GB | 965465 A | 7/1964 |
| GB | 1129937 A | 10/1968 |
| GB | 2 107 002 A | 4/1983 |
| JP | S51-29648 A | 3/1976 |

OTHER PUBLICATIONS

Jun. 6, 2015 Search Report issued in British Patent Application No. 1421880.4.

U.S. Appl. No. 14/961,124, filed Dec. 7, 2015 in the name of Gallimore et al.

May 27, 2016 Search Report issued in European Patent Application No. 15197773.

May 27, 2016 Search Report issued in European Patent Application No. 15197774.

* cited by examiner

BEARING STRUCTURE

TECHNOLOGICAL FIELD

The present disclosure relates to a bearing arrangement and a gas turbine engine having such a bearing arrangement.

BACKGROUND

In gas turbine engines, one or more rotors of the engine can be subjected to axial thrust loads during operation. Thrust loads arise in a gas turbine engine as the result of pressure imbalances. For example, a compressor has a higher downstream pressure than upstream pressure which forces the compressor upstream (towards the intake) whereas a turbine has a higher upstream pressure than downstream pressure which forces the turbine downstream (towards the exhaust nozzle). The thrust loads urging the compressor upstream and the turbine downstream are high and uncertain.

The thrust loads are often at theft maximum during the periods of highest power output for the engine. In a gas turbine engine providing jet propulsion for an aircraft, this period of maximized power output can occur when the aircraft is taking-off and/or climbing to a cruising altitude. The thrust loads can change direction (passing through a zero bad point) during a flight cycle.

A thrust bearing can be positioned to support the rotor against these thrust loads. A thrust bearing typically comprises an inner and outer race, a cage and a set of rolling elements, the rolling elements being spheres (or balls) which are contained within a raceway formed in one or both of the races with the cage maintaining the spacing between the balls.

Since single thrust bearings inevitably have a limited thrust capability, two or more bearings may be arranged adjacent one another to share the thrust load. In these bearing arrangements, under-loading of one set of rolling elements may result in "skidding" of that set, which may cause damage, debris release and bearing failure. There is a desire to provide a bearing arrangement which improves the balancing of thrust load bearing between bearings in order to reduce excessive loading or under-loading of a bearing thus reducing bearing failure and vibration/skidding.

BRIEF SUMMARY

According to a first aspect there is provided a bearing structure comprising:

a first bearing having a first inner race, a first outer race and a first set of rolling elements housed between the first inner race and the first outer race;

a second bearing having a second inner race, a second outer race and a second set of rolling elements housed between the second inner race and the second outer race;

a housing surrounding the first bearing;

a first compliant element, the first compliant element fixedly connected to the first outer race, a rigid diaphragm having a radially inner end fixedly connected to the first outer race at a position spaced from the connection between the first compliant element and the first outer race, and a radially outer end flexibly connected to the housing, wherein the first compliant element, first outer race and rigid diaphragm at least partly define a pressure chamber; and wherein the first outer race is axially slidable relative to the second outer race such that an increase in pressure in the pressure chamber causes a change in axial spacing between the first and second outer races.

By providing a first outer race that is axially slidable relative to the second outer race upon an increase in pressure in the pressure chamber defined by the first outer race, first compliant element and rigid diaphragm, it is possible to vary the axial spacing between the outer races and to induce an additional axial load on the bearings. When the pressure in the pressure chamber increases, the first compliant element is forced in one direction with the rigid diaphragm being forced in the opposing direction. As the rigid diaphragm is fixedly connected to the first outer race, the outer race is moved with the rigid diaphragm. The additional axial load can be induced in situations where under-loading of a bearing is predicted or measured to ensure that vibration/skidding of the bearing is avoided. Furthermore, by increasing the axial load on the potentially under-loaded bearing, this bearing becomes better able to transmit the thrust load thus resulting in a more equal sharing of the thrust load between the bearings.

The following features are applicable singly or in any combination with any aspect of the disclosure.

In some embodiments, the rigid diaphragm is flexibly connected to the housing at its radially outer end through a flexible element e.g. a flexible diaphragm or bellows. The flexible element may be formed, for example, from mild steel, stainless steel, steel alloy, titanium alloy or a super elastic material. These are materials with a high ratio of strength to elasticity. The flexible element may be fixedly connected to the housing.

In other embodiments, the rigid diaphragm is flexibly connected to the housing at its radially outer end through a sliding connection with the housing.

In some embodiments, the first outer race comprises a radially extending flange and the radially inner end of the rigid diaphragm is fixedly connected to the flange.

In some embodiments, the housing further comprises a first radially extending casing. The first compliant element is fixedly connected between the first radially extending casing and the first outer race. In these embodiments, the pressure chamber is partly defined by the first radially extending casing.

The first compliant element may be connected to an axial end of the first outer race. It may be connected to the axial end of the first outer race proximal or distal the second bearing.

The first and second inner races are connected to a common rotor and may be proximal (e.g. adjacent) each other or may be spaced from one another along the rotor.

The first bearing may be upstream or downstream from the second bearing.

In some embodiments, the housing further comprises a radially and axially extending support to which the second outer race is connected.

In some embodiments, the bearing structure further includes a second compliant element, the second compliant element fixedly connected to the first outer race at the opposing axial end to the first compliant element. In these embodiments, the rigid diaphragm is interposed between the first and second compliant elements such that the pressure chamber is divided into a first pressure chamber defined at least partly by the first compliant element, rigid diaphragm and first outer race and a second pressure chamber defined at least partly by the second compliant element, rigid diaphragm and first outer race.

The rigid diaphragm (and radially extending flange on the first outer race) may be provided midway between the two compliant elements such that the pressure chambers are substantially the same size.

In some embodiments, the housing further comprises a second radially extending casing. The second compliant element is fixedly connected between the second radially extending casing and the first outer race. In these embodiments, the second pressure chamber is partly defined by the second radially extending casing.

In some embodiments, the first/second compliant element may be a flexible diaphragm.

In some embodiments, the first/second compliant element may be a flexible bellows.

The flexible diaphragm(s)/bellow(s) may be formed, for example, from rubber, mild steel, stainless steel, steel alloy, titanium alloy or a super elastic material. In some embodiments, a valved pressure inlet is provided to provide fluid communication from a pressure source to the pressure chamber. Where two pressure chambers are provided, two separate valved pressure inlets are provided through the housing each providing fluid communication between the pressure source and the respective pressure chamber. The valved pressure inlets are separately operable to allow selective pressurisation of the two pressure chambers.

In other embodiments, the pressure inlet(s) may omit the valve(s) and may be permanently open to the pressure source.

The pressure inlet(s) may be duplicated for the/each pressure chamber so that the effects of any blocking or failure of the inlet(s) can be minimised.

The pressure source may comprise compressed air (e.g. from the starter air supply or the HP compressor delivery air) or high pressure hydraulic fluid (e.g. derived from the oil system).

In some embodiments, a valved pressure outlet is provided to allow venting of pressure from within the pressure chamber. Where two pressure chambers are provided, two separate valved pressure outlets are provided through the housing each allowing venting from the respective pressure chamber. The valved pressure outlets are separately operable to allow selective de-pressurisation of the two pressure chambers. The valved pressure outlet(s) may be coincident with the valved pressure inlet(s).

In some embodiments, the bearing structure comprises load sensors associated with each bearing. The load sensors may, for example, include eddy current probes, strain gauges or microwave probes. These load sensors can be used to monitor the axial loads on each bearing to provide feedback to an electronic control module (ECM). The ECM can trigger pressurisation of the pressure chamber(s) (through the pressure inlet(s)) if the axial load on any bearing is found to be below a predetermined minimum (e.g. 1000 lbf≈4450 N).

The load sensors and ECM can be used to trigger venting of the pressure chamber(s) (through the pressure outlet(s)).

The load sensors and ECM can be used to continually/regularly adjust the pressure within the pressure chamber(s) to maintain the axial loading on each bearing above a predetermined minimum (e.g. 1000 lbf≈4450 N).

In some embodiments, the bearing structure comprises a pressure sensor arranged to detect the pressure within the/each pressure chamber.

The bearing structure may comprise three or more thrust bearings.

The thrust bearings may be ball bearings, tapered cylindrical rolling bearings, hydrostatic bearings, or hydrodynamic bearings.

In a second aspect, there is provided a gas turbine engine comprising a bearing structure according to the first aspect.

BRIEF DESCRIPTION

Embodiments will now be described by way of example with reference to the accompanying drawings in which:
FIG. 1 shows a ducted fan gas turbine engine;
FIG. 2 shows a first embodiment of a bearing structure;
FIG. 3 shows a second embodiment of a bearing structure;
FIG. 4 shows the second embodiment in mounted on a low pressure rotor;
FIG. 5 shows the second embodiment mounted on the low pressure and intermediate pressure rotors; and
FIG. 6 shows the second embodiment mounted on a high pressure rotor.
FIG. 7 illustrates a schematic of the ECU and logical connections to the load sensors and valved pressure inlet/outlets.

DETAILED DESCRIPTION

With reference to FIG. 1, a ducted fan gas turbine engine incorporating the bearing structure of the present disclosure is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

The outermost rotor is the High Pressure (HP) rotor 20 also known as the HP compressor drive cone. This rotor 20 connects the high pressure compressor 14 with the high pressure turbine 16. The next innermost rotor is the Intermediate Pressure (IP) rotor 26 which connects the intermediate pressure compressor 13 to the intermediate pressure turbine 17.

Finally, the low pressure (LP) rotor 30 is innermost, connecting the low pressure turbine 18 to the fan 12.

The LP, IP and HP rotors 20, 26, 30 are subjected to axial forces arising from the downstream forces generated by the turbines 16, 17, 18 and the upstream forces generated by the compressors 14, 13 or fan 12.

Thrust bearing structures such as that shown in the following figures are provided to support the rotating shafts.

FIG. 2 shows a first embodiment of a bearing structure 1 comprising a first bearing 2 having a first inner race 3, a first outer race 4 and a first set of rolling elements 5 housed between the first inner race 3 and the first outer race 4.

A second bearing 6 having a second inner race 7, a second outer race 8 and a second set of rolling elements 9 housed between the second inner race 7 and the second outer race 8 is provided adjacent the first bearing 2.

Both of the inner races 3, 7 are connected to and rotate with a rotor, in this case the LP rotor 20. The first outer race 4 faces an annular housing 24 which is a static component within the gas turbine engine. The annular housing has a support 32 which extends radially and axially. The second outer race 8 is fixedly connected to the support 32.

The housing 24 further comprises a first rigid radially extending casing 25.

A first compliant element 26 comprising flexible bellows is fixedly connected at its radially inner end to a first axial end 27 of the first outer race 4 and, at its radially outer end to the first casing 25.

A rigid diaphragm 28 is fixed connected to a flange 29 extending radially from the first outer race 4 proximal the opposing axial end 35 of the first outer race 4. The rigid diaphragm 28 is flexibly connected to the housing 24 through a flexible element 31. In this case, the flexible element 31 comprises flexible bellows.

In this embodiments, the diaphragm 28 is proximal the second bearing 6 but the first bearing could be modified so that the diaphragm is distal the second bearing 6 and the first compliant element 26 is proximal the second bearing.

The flexible bellows of the flexible element 31 and the first compliant element 26 are formed, for example, from rubber, mild steel, stainless steel, steel alloy, titanium alloy or a super elastic material The first outer race 4, rigid diaphragm 28, first casing 25 and first compliant element 26 define a first pressure chamber 33.

The pressure chamber 33 is in fluid communication with a pressure source (not shown) through a pressure inlet 34.

When the pressure in the pressure chamber 33 is increased (e.g. by the introduction of hydraulic fluid or high pressure air), the force on the first compliant element 26 is reacted by a force on the rigid diaphragm and the rigid diaphragm 28 is moved towards the second bearing 6. The fixed connection between the rigid diaphragm 28 and the first outer race 29 means that the first outer race moves towards the second outer race 8. If the geometrical inconsistencies between the two bearings 2, 6 (arising from manufacturing intolerances and thermal expansion anomalies) result in the inner races 3, 7 being closer together than the outer races, 4, 8, movement of the first outer race towards the second outer race reduces the loading on the second bearing 6 and increases the loading on the first bearing 2.

FIG. 3 shows a second embodiment that is similar to the first embodiment but that further comprises a second casing 36 extending radially from the housing 24 and a second compliant element 37 fixedly connected between the second axial end 35 of the first outer race 4 (opposing the first axial end 27 where the first compliant element 26 is connected) and the second casing 36.

The first outer race 4, second casing 36, second compliant element 37 and rigid diaphragm 28 define a second pressure chamber 38.

In this embodiment, the flange 29 is provided substantially midway between the axial ends 27, 35 on the first outer race 4 such that the first and second pressure chambers 33, 38 are substantially the same size.

The relative pressure in each of the first and second pressure chambers 33, 38 can be controlled (e.g. by the introduction of hydraulic fluid into one chamber through the appropriate pressure inlet 34 and/or venting of hydraulic fluid from one chamber).

If the second pressure chamber 38 is at a higher pressure than the first pressure chamber 33 then the rigid diaphragm 28 will push the first outer race 4 to the right. If the second pressure chamber 38 is at a lower pressure than the first pressure chamber 33 then the rigid diaphragm 28 will push the first outer race 4 to the left.

The bearing structure 1 comprises load sensors 120 associated with each bearing 2, 6. These load sensors 120 are used to monitor the axial loads on each bearing to provide feedback to an electronic control unit (ECU) 160.

If load sensors 120 detect a greater loading on the first (downstream) bearing 2, the ECU 160 triggers pressurisation of the first pressure chamber 33 which causes the first outer race 4 to move towards the second outer race 8 thus transferring thrust load to the second (upstream) bearing 6. Conversely, if the load sensors 120 detect a greater loading on the second (upstream) bearing 6, the ECU 160 triggers pressurisation of the second pressure chamber 38. This causes the second upper race 8 to move away from the first upper race 4 thus transferring thrust load to the first (downstream) bearing 2.

As can be seen in FIG. 7, a valved pressure inlet 110 is provided through the housing 24 to provide fluid communication from a pressure source to the pressure chamber 30.

A valved pressure outlet 100 is provided through the housing 24 to allow venting of pressure from within the pressure chamber 30.

FIG. 4 shows the second embodiment mounted on the LP rotor 20. In this case, the second pressure chamber 38 is pressurised when the thrust load is high to reduce the maximum load on the second bearing 6. When the thrust load is low, (typically below 1000 lbf) the second pressure chamber 38 is vented and the first pressure chamber is pressurised so that the load on the second bearing 6 is increased.

In situations where thrust load is reversed (and therefore passes through zero), it is possible to rapidly reverse the pressurisation of the two chambers 33, 38 to control the bearing loadings and avoid skidding of under-loaded bearings. For example, if the first pressure chamber 33 is at a higher pressure than the second pressure chamber 38 in order to increase thrust load when the rotor thrust is low, at a pre-determined minimum load condition where the reverse rotor thrust is being off-set by a larger first bearing lead, the first pressure chamber 33 can vented whilst the second pressure chamber 38 is pressurised to reverse the load on the second bearing.

Figure 1:
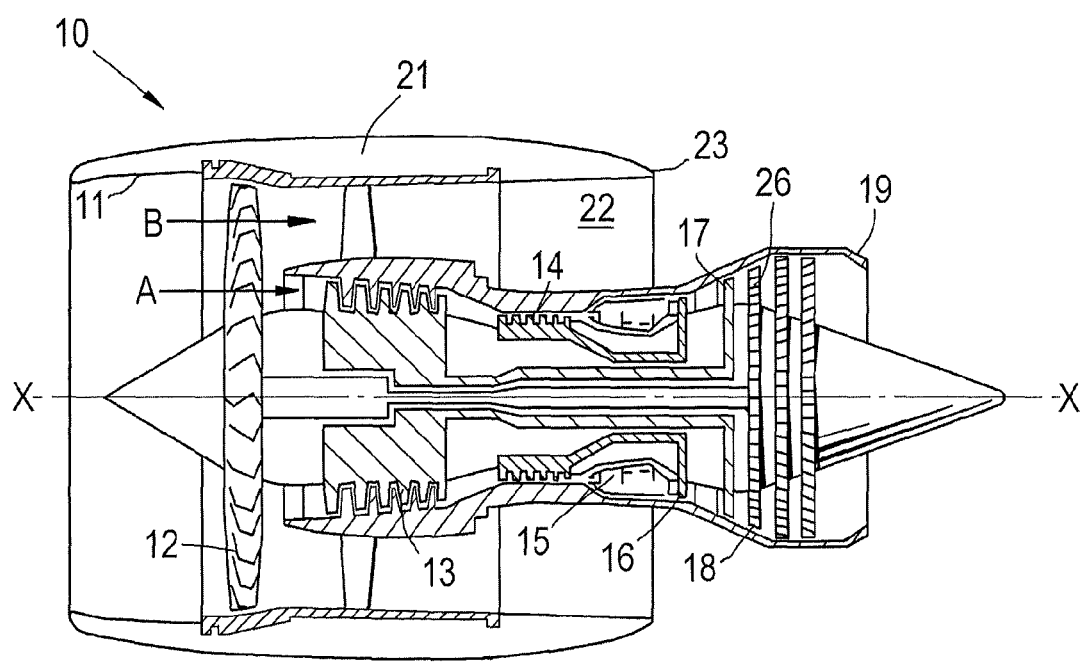
Figure 2:
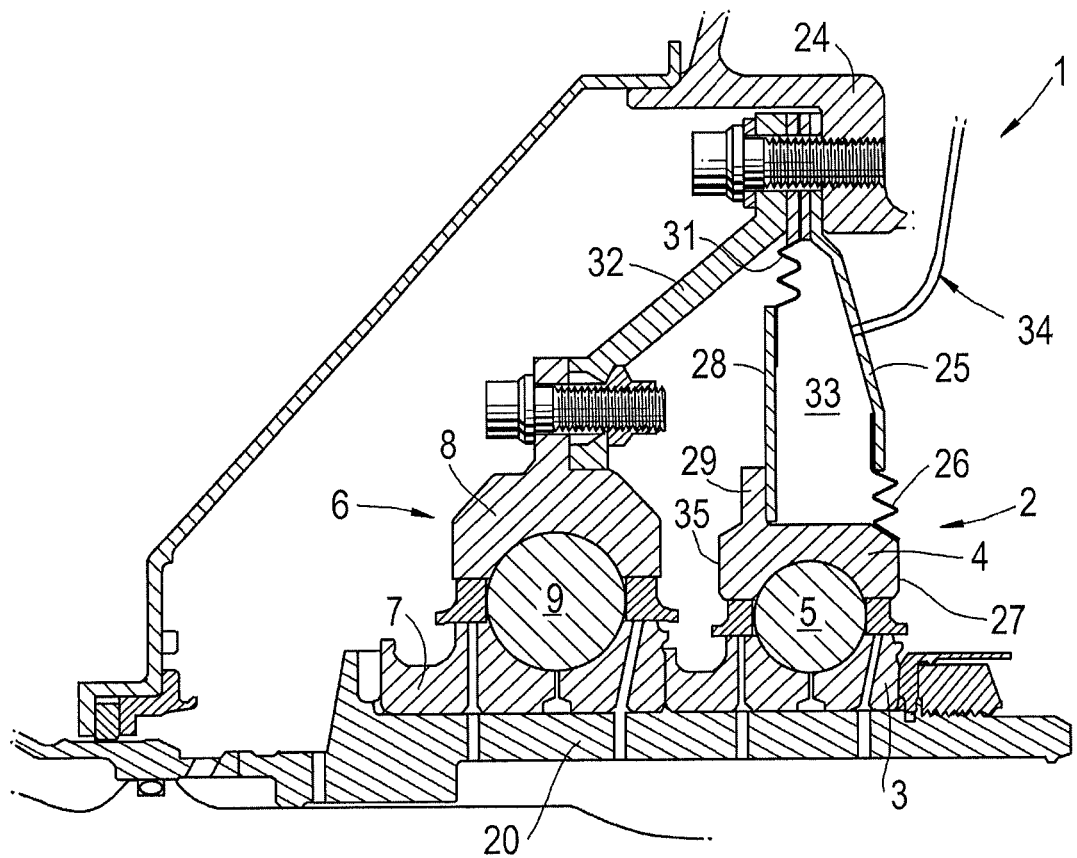
Figure 3:
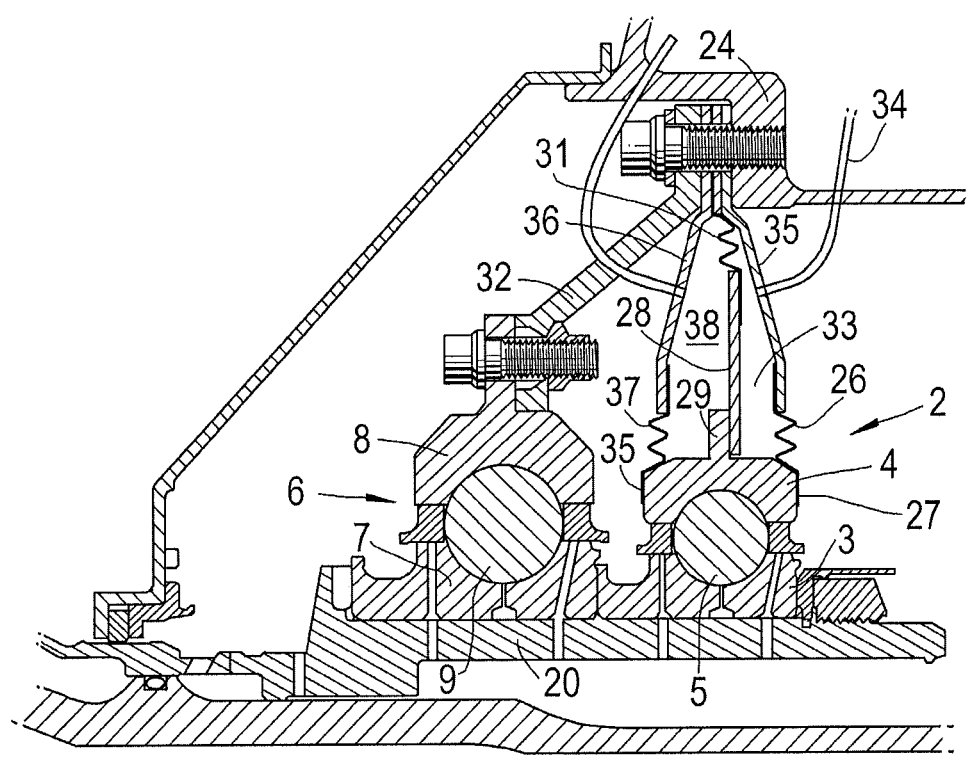
Figure 4:
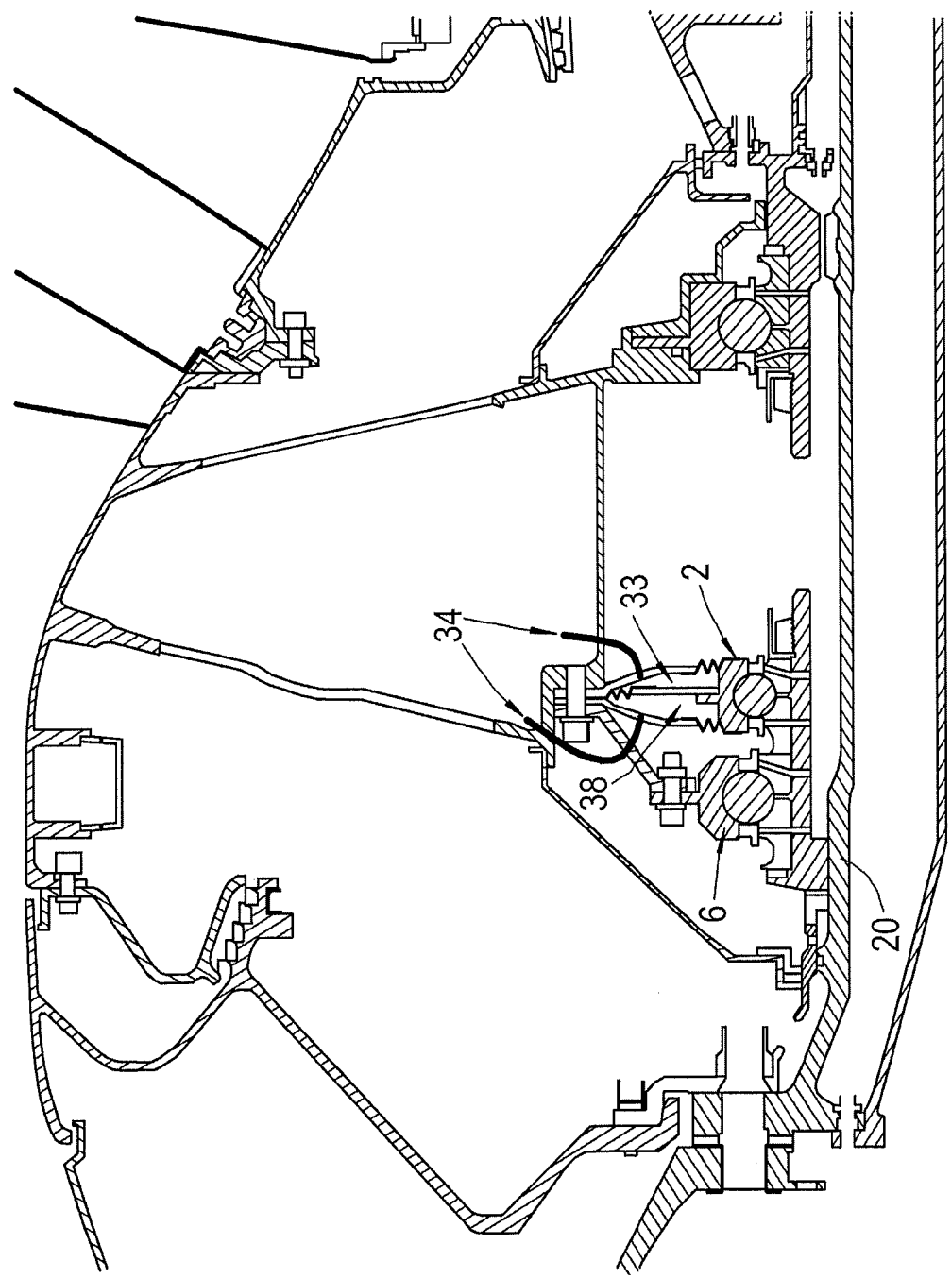
Figure 5:
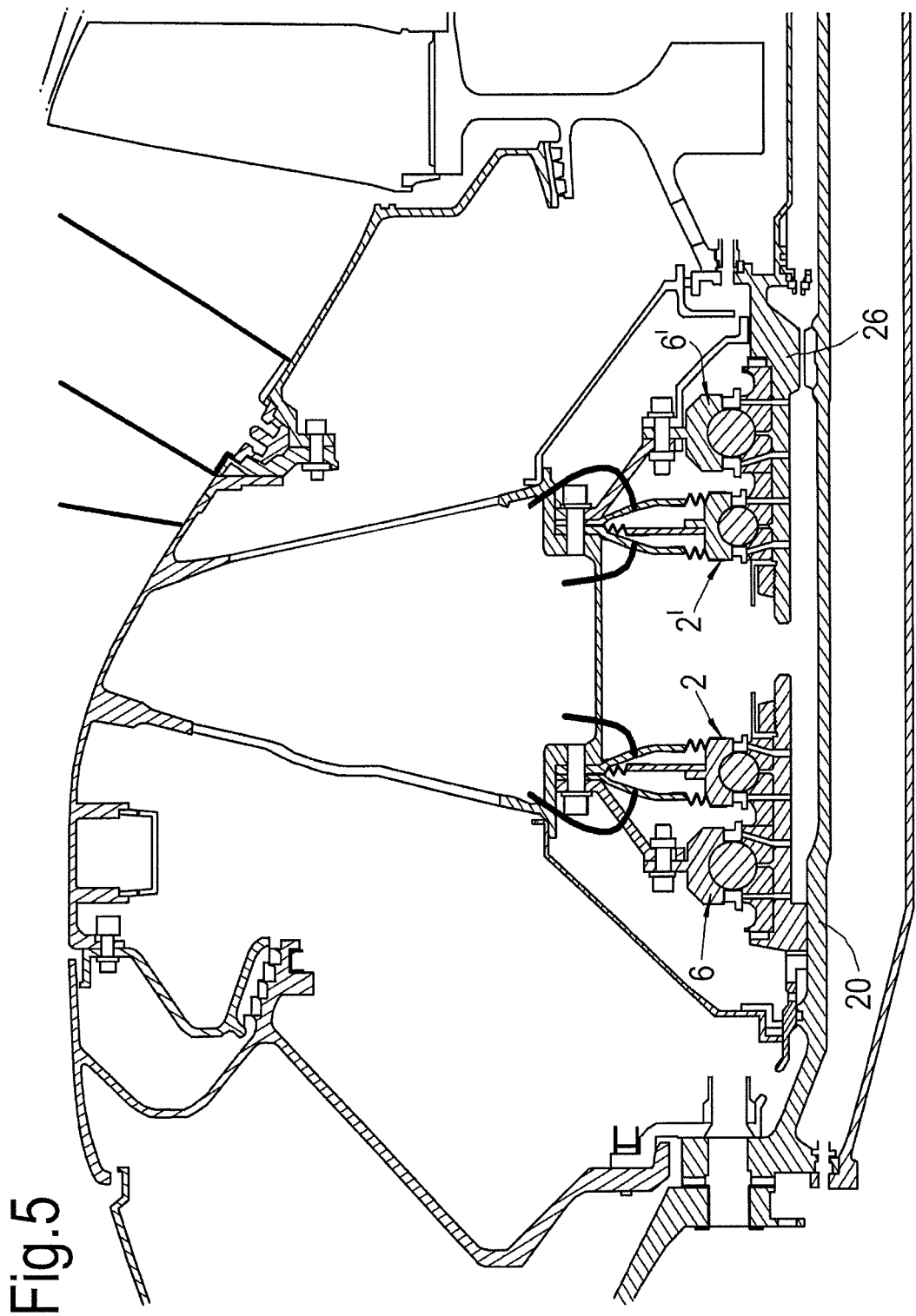
FIG. 5 shows that the bearings according to the second embodiment can be provided on both the LP rotor 20 and the IP rotor 26.
Figure 6:
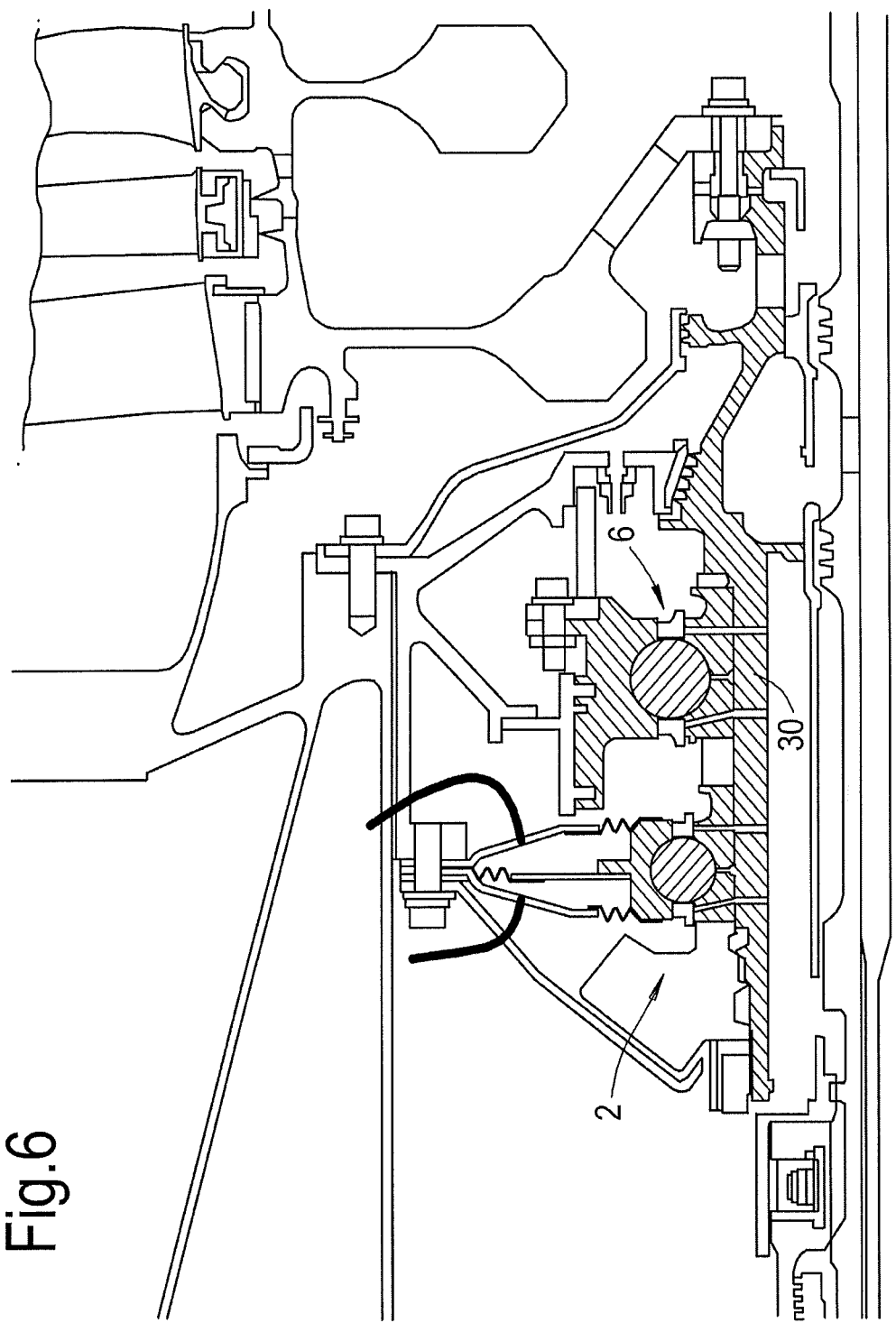
FIG. 6 shows that the bearings according to the second embodiment can also be provided on the HP rotor 30.
Figure 7:
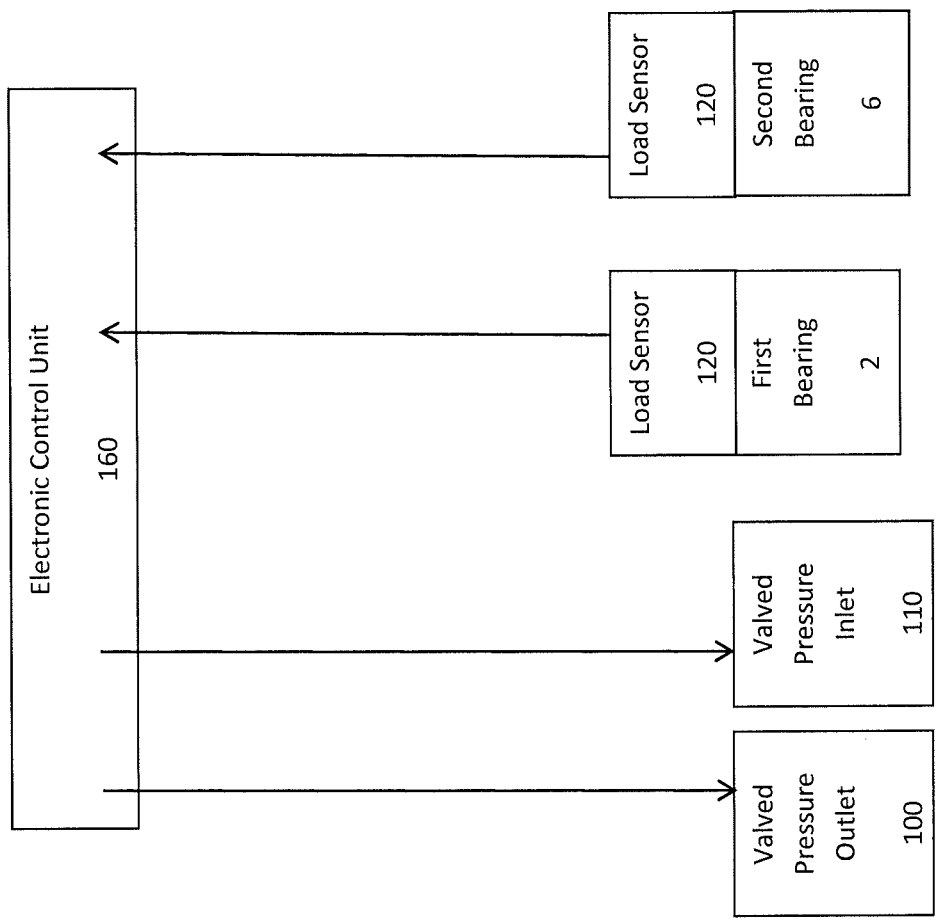

While the bearing structure has been described in conjunction with the exemplary embodiments described above, many equivalent modifications and variations will be apparent to those skilled in the art when given this disclosure. Accordingly, the exemplary embodiments set forth above are considered to be illustrative and not limiting. Various changes to the described embodiments may be made without departing from the scope as defined in the claims.

It will be appreciated that the ECU can be a general purpose computer configured with a processor, memory and software to perform the above functions. Additionally, the ECU may constitute a field programmable gate array (FPGA), or Application Specific Integrated Circuits (ASICs) to perform the functions described above, or any other suitable processing device capable of being configured to perform the desire functions.

All references referred to above are hereby incorporated by reference.

The invention claimed is:

1. A bearing structure comprising:
a first bearing having a first inner race, a first outer race and a first set of rolling elements housed between the first inner race and the first outer race;
a second bearing having a second inner race, a second outer race and a second set of rolling elements housed between the second inner race and the second outer race;
a housing surrounding the first bearing;
a first compliant element, the first compliant element fixedly connected to the first outer race,
a rigid diaphragm having a radially inner end fixedly connected to the first outer race at a position spaced from the connection between the first compliant element and the first outer race, and a radially outer end flexibly connected to the housing,
wherein the first compliant element, first outer race and rigid diaphragm at least partly define a pressure chamber; and
wherein the first outer race is axially slidable relative to the second outer race such that an increase in pressure in the pressure chamber causes a change in axial spacing between the first and second outer races.

2. A bearing structure according to claim 1 wherein the rigid diaphragm is flexibly connected to the housing at its radially outer end through a flexible element.

3. A bearing structure according to claim 2 wherein the flexible element is a flexible diaphragm or bellows.

4. A bearing structure according to claim 1 wherein the first outer race comprises a radially extending flange and the radially inner end of the rigid diaphragm is fixedly connected to the flange.

5. A bearing structure according to claim 1 wherein the housing further comprises a first radially extending casing and the first compliant element is fixedly connected between the first radially extending casing and the first outer race.

6. A bearing structure according to claim 1 wherein the first compliant element is connected to an axial end of the first outer race.

7. A bearing structure according to claim 1 further comprising a second compliant element fixedly connected to the first outer race.

8. A bearing structure according to claim 7 wherein the first compliant element is connected at an axial end of the first outer race and the second compliant element is connected at the opposing axial end.

9. A bearing structure according to claim 8 wherein the rigid diaphragm is interposed between the first and second compliant elements such that the pressure chamber is divided into a first pressure chamber defined at least partly by the first compliant element, rigid diaphragm and first outer race and a second pressure chamber defined at least partly by the second compliant element, rigid diaphragm and first outer race.

10. A bearing structure according to claim 9 wherein the rigid diaphragm is provided midway between the two compliant elements such that the pressure chambers are substantially the same size.

11. A bearing structure according to claim 7 wherein the housing further comprises a second radially extending casing and the second compliant element is fixedly connected between the second radially extending casing and the first outer race.

12. A bearing structure according to claim 1 wherein the first and/or second compliant element is a flexible bellows.

13. A bearing structure according to claim 1 further comprising a valved pressure inlet or a respective valved pressure inlet to provide fluid communication from a pressure source to the respective pressure chamber.

14. A bearing structure according to claim 1 further comprising a valved pressure outlet or a respective valved pressure outlet to allow venting of pressure from within the or the respective pressure chamber.

15. A bearing structure according to claim 1 further comprising at least one load sensor associated with each of the first bearing and the second bearing.

16. A bearing structure according to claim 15, further comprising an electronic control module, the at least one load sensor being configured to monitor axial loads on the first bearing and the second bearing to provide feedback to the electronic control module.

17. A bearing structure according to claim 16, wherein the electronic control module is configured to trigger pressurisation of at least the pressure chamber if the axial load on the first bearing or the second bearing is found to be below a predetermined minimum.

18. A bearing structure according to claim 16, wherein the at least one load sensor and the electronic control module are configured to trigger venting of the pressure chamber.

19. A bearing structure as claimed in claim 16, wherein the at least one load sensor and the electronic control module are configured to continually or regularly adjust the pressure within the pressure chamber to maintain the axial loading on the first bearing and the second bearing above a predetermined minimum.

20. A gas turbine engine comprising a bearing structure according to claim 1.

* * * * *